United States Patent
Liu et al.

(10) Patent No.: US 10,942,870 B1
(45) Date of Patent: Mar. 9, 2021

(54) CIRCUITRY AND METHOD

(71) Applicant: Arm Limited, Cambridge (GB)

(72) Inventors: Yongkang Liu, Shanghai (CN); Zhenzhen Zhu, Shanghai (CN)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/578,571

(22) Filed: Sep. 23, 2019

(51) Int. Cl.
*G06F 3/06* (2006.01)
*G06F 12/14* (2006.01)
*G06F 13/18* (2006.01)

(52) U.S. Cl.
CPC ...... *G06F 12/1441* (2013.01); *G06F 12/1491* (2013.01); *G06F 13/18* (2013.01); *G06F 3/0644* (2013.01)

(58) Field of Classification Search
None
See application file for complete search history.

(56) References Cited

U.S. PATENT DOCUMENTS

| | | | |
|---|---|---|---|
| 9,323,657 B1 * | 4/2016 | Sela | G06F 11/0793 |
| 2009/0307690 A1 * | 12/2009 | Logan | G06F 11/073 718/1 |
| 2018/0203723 A1 * | 7/2018 | Krueger | G06F 3/0656 |

* cited by examiner

*Primary Examiner* — Brian R Peugh
(74) *Attorney, Agent, or Firm* — Nixon & Vanderhye P.C.

(57) ABSTRACT

Circuitry comprises memory access control circuitry responsive to initiation of a memory access transaction relating to a given memory address, the memory access transaction being initiated in an access mode selected from at least a higher access mode and a lower access mode, the higher access mode having a higher access level than the lower access mode such that memory access transactions in the lower access mode are inhibited from accessing at least some processing resources associated with memory access transactions in the higher access mode, the memory access control circuitry comprising: circuitry to access permission data associated with candidate memory addresses to be accessed; detector circuitry to detect, for a memory access transaction initiated in the lower access mode, whether the permission data associated with the given memory address indicates an upgraded access mode; and transaction modifier circuitry to associate with the memory access transaction an indication that the memory access transaction may proceed in the higher access mode, when the detector circuitry detects that the permission data associated with the given memory address indicates an upgraded access mode.

15 Claims, 3 Drawing Sheets

CIRCUITRY AND METHOD

BACKGROUND

This disclosure relates to circuitry and methods.

Example circuitry known as a Memory Protection Unit (MPU) is used widely in integrated circuit designs, for example in so-called systems on chip (SoC) or networks on chip (NoC) for use in Internet of Things (IoT) applications. An MPU may for example provide permission data to access certain addresses or regions of a virtual memory address space, a so-called intermediate physical address space or a physical memory address space.

Another technique, referred to for example as execution privilege, is used to control whether certain processing resources are available or not to an initiator of a memory access transaction (such as a thread or process).

This can lead to a potential conflict of requirements. A thread may work as a driver and need to access privileged hardware registers. But the same thread may need to be isolated so it cannot operate in privileged mode, since then it could change MPU settings in privileged mode to enable itself accessing all memories. However non-privileged threads cannot access hardware registers.

SUMMARY

In an example arrangement there is provided circuitry comprising:

memory access control circuitry responsive to initiation of a memory access transaction relating to a given memory address, the memory access transaction being initiated in an access mode selected from at least a higher access mode and a lower access mode, the higher access mode having a higher access level than the lower access mode such that memory access transactions in the lower access mode are inhibited from accessing at least some processing resources associated with memory access transactions in the higher access mode, the memory access control circuitry comprising:

circuitry to access permission data associated with candidate memory addresses to be accessed;

detector circuitry to detect, for a memory access transaction initiated in the lower access mode, whether the permission data associated with the given memory address indicates an upgraded access mode; and transaction modifier circuitry to associate with the memory access transaction an indication that the memory access transaction may proceed in the higher access mode, when the detector circuitry detects that the permission data associated with the given memory address indicates an upgraded access mode.

In another example arrangement there is provided circuitry comprising:

memory access control means responsive to initiation of a memory access transaction relating to a given memory address, the memory access transaction being initiated in an access mode selected from at least a higher access mode and a lower access mode, the higher access mode having a higher access level than the lower access mode such that memory access transactions in the lower access mode are inhibited from accessing at least some processing resources associated with memory access transactions in the higher access mode, the memory access control means comprising:

means for accessing permission data associated with candidate memory addresses to be accessed;

means for detecting, for a memory access transaction initiated in the lower access mode, whether the permission data associated with the given memory address indicates an upgraded access mode; and means for associating with the memory access transaction an indication that the memory access transaction may proceed in the higher access mode, when the detecting means detects that the permission data associated with the given memory address indicates an upgraded access mode.

In another example arrangement there is provided a method comprising:

detecting initiation of a memory access transaction relating to a given memory address, the memory access transaction being initiated in an access mode selected from at least a higher access mode and a lower access mode, the higher access mode having a higher access level than the lower access mode such that memory access transactions in the lower access mode are inhibited from accessing at least some processing resources associated with memory access transactions in the higher access mode;

accessing permission data associated with candidate memory addresses to be accessed;

detecting, for a memory access transaction initiated in the lower access mode, whether the permission data associated with the given memory address indicates an upgraded access mode; and associating with the memory access transaction an indication that the memory access transaction may proceed in the higher access mode, in response to a detection that the permission data associated with the given memory address indicates an upgraded access mode.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
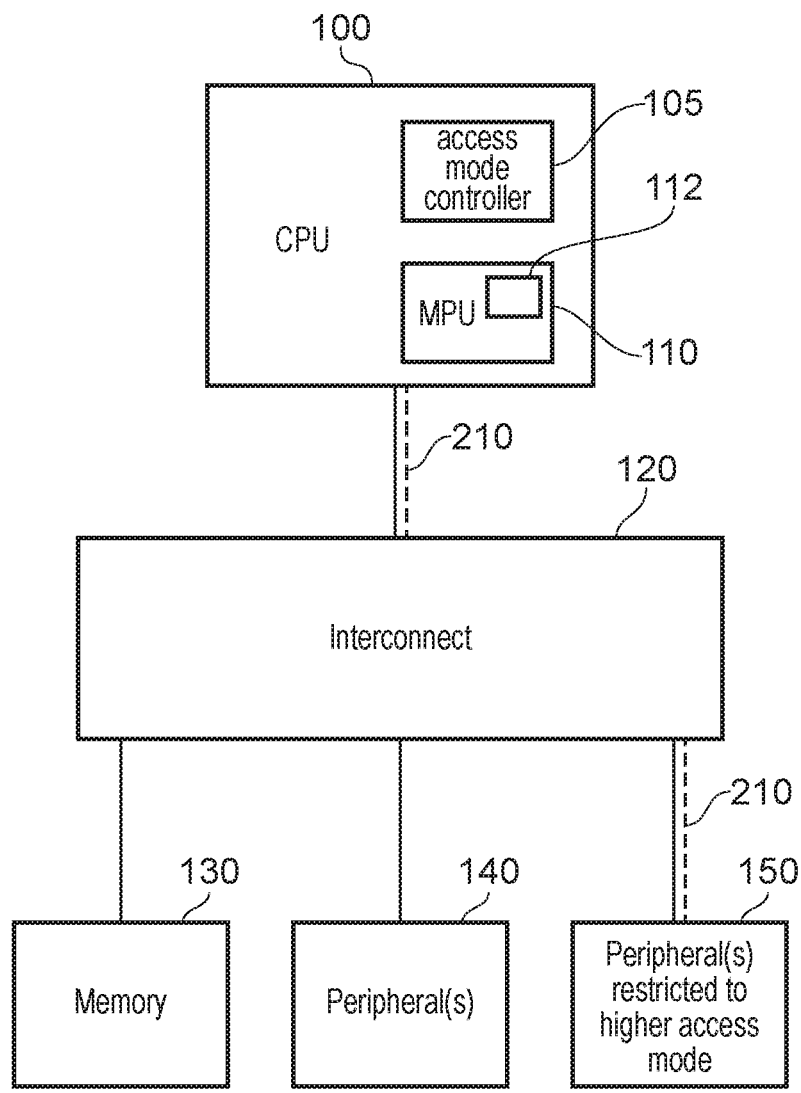
FIG. 1 schematically illustrates an example data processing apparatus.

Before discussing the embodiments with reference to the accompanying figures, the following description of embodiments is provided.

An example embodiment provides circuitry comprising:

memory access control circuitry responsive to initiation of a memory access transaction relating to a given memory address, the memory access transaction being initiated in an access mode selected from at least a higher access mode and a lower access mode, the higher access mode having a higher access level than the lower access mode such that memory access transactions in the lower access mode are inhibited from accessing at least some processing resources associated with memory access transactions in the higher access mode, the memory access control circuitry comprising:

circuitry to access permission data associated with candidate memory addresses to be accessed;

detector circuitry to detect, for a memory access transaction initiated in the lower access mode, whether the permission data associated with the given memory address indicates an upgraded access mode; and transaction modifier circuitry to associate with the memory access transaction an indication that the memory access transaction may proceed in the higher access mode, when the detector circuitry detects that the permission data associated with the given memory address indicates an upgraded access mode.

In example embodiments, a thread, process or other example of executing program code or other initiator of a memory access transaction can operate in a lower access mode (such as a lower execution privilege) for some memory access transactions, but selectively, when a higher access mode is required to access particular processing resources, for example to access hardware registers, the access mode associated with the memory access transaction can be upgraded in response to data held or accessed by circuitry such as a memory protection unit. In this way not only can the memory protection unit provide permission data to indicate a permission level associated with a candidate memory address to be accessed, it can also provide even a transaction initiated at the lower access mode with an upgraded access mode to complete the transaction.

In some embodiments, the circuitry comprises an interface to a transaction bus to carry data defining memory access transactions; the transaction bus carrying access mode data (for example a dedicated bus line or the like) indicating an access mode of a memory access transactions carried by the transaction bus. This allows for an elegantly convenient way of implementing the upgrading of access mode, which by the circuitry setting the access mode data to indicate the higher access mode when the detector circuitry detects that the permission data associated with the given memory address indicates an upgraded access mode.

In order to avoid a memory access transaction at the lower access mode altering the permission data itself and so allowing the transaction initiator or another party potentially unlimited access to any memory location, in example embodiments the circuitry to access permission data is configured to inhibit modification of the permission data by a memory access transaction in the lower access mode. This can be achieved, for example, by the permission data being configured not to indicate an upgraded access mode for access to the permission data.

In order to provide example memory protection unit operations, in embodiments the circuitry to access permission data is configured to access permission data in respect of one or more ranges of memory addresses; and the detector circuitry is configured to detect whether the given memory address lies within a range of memory addresses selected from the one or more ranges of memory addresses.

For example the circuitry may comprise storage circuitry to store the permission data; wherein the circuitry to access permission data is configured to access the storage circuitry.

In addition to its permission-based functions as discussed above, the circuitry may also provide memory management functions, by comprising translation circuitry to translate input memory addresses (for example, virtual memory addresses) to respective output memory addresses (such as physical memory addresses or so-called intermediate physical addresses). In example arrangements, the memory access control circuitry is configured to receive a memory access transaction relating to a given input memory address; the translation circuitry is configured to translate the given input memory address to a given output memory address; and the memory access control circuitry is configured to launch the memory access transaction for processing using the given output memory address. For example the given memory address may be one of the given input memory address and the given output memory address.

In some examples the translation circuitry may be configured to access stored translation data indicative of translations between input memory addresses and respective output memory addresses. In particular examples the circuitry comprises storage circuitry to store the translation data indicative of translations between input memory addresses and respective output memory addresses; wherein the storage circuitry is configured to store the permission data associated with one of the input memory addresses and the respective output memory addresses.

Although the higher and lower access modes could refer to security levels, in at least some examples the higher access mode has a higher execution privilege and the lower access mode has a lower execution privilege. Note that the reference to higher and lower access modes simply defines a relative difference between these two example modes and does not preclude there being more than two access modes.

Another example embodiment provides circuitry comprising:

memory access control means responsive to initiation of a memory access transaction relating to a given memory address, the memory access transaction being initiated in an access mode selected from at least a higher access mode and a lower access mode, the higher access mode having a higher access level than the lower access mode such that memory access transactions in the lower access mode are inhibited from accessing at least some processing resources associated with memory access transactions in the higher access mode, the memory access control means comprising:

means for accessing permission data associated with candidate memory addresses to be accessed;

means for detecting, for a memory access transaction initiated in the lower access mode, whether the permission data associated with the given memory address indicates an upgraded access mode; and means for associating with the memory access transaction an indication that the memory access transaction may proceed in the higher access mode, when the detecting means detects that the permission data associated with the given memory address indicates an upgraded access mode.

Another example embodiment provides a method comprising:

detecting initiation of a memory access transaction relating to a given memory address, the memory access transaction being initiated in an access mode selected from at least a higher access mode and a lower access mode, the higher access mode having a higher access level than the lower access mode such that memory access transactions in the lower access mode are inhibited from accessing at least some processing resources associated with memory access transactions in the higher access mode;

accessing permission data associated with candidate memory addresses to be accessed;

detecting, for a memory access transaction initiated in the lower access mode, whether the permission data associated with the given memory address indicates an upgraded access mode; and associating with the memory access transaction an indication that the memory access transaction may proceed in the higher access mode, in response to a detection that the permission data associated with the given memory address indicates an upgraded access mode.

Referring now to the drawings, FIG. 1 schematically illustrates an example of a data processing apparatus, comprising processing circuitry 100 (for example a central processing unit or CPU) to execute program instructions, the processing circuitry 100 comprising at least an access mode controller 105 and a memory protection unit (MPU) 110. The apparatus of FIG. 1 also comprises an interconnect 120, a memory system 130, one or more peripheral devices 140 and one or more further peripheral devices 150 which are restricted to a higher access mode.

In use, program instructions executed by the processing circuitry 100, for example as one or more threads or processes, are able to launch memory access transactions so as to access program resources at respective memory addresses. These could include for example memory storage in the memory system 130, hardware registers for example associated with the processing circuitry 100, registers or other memory-mapped resources at the one or more peripheral devices 140, 150 or the like.

The apparatus of FIG. 1 may be implemented as a so-called system on chip (SoC), a so-called network on chip (NoC) or as discrete components in various respective examples.

Various aspects of the apparatus of FIG. 1 are relevant to determining whether and how a thread is able to execute such a transaction.

One such aspect is so-called memory protection, provided by the MPU 110. In response to a transaction being initiated by a running thread, an address or range of addresses being accessed by that transaction are compared, at the MPU 110, to reference ranges of memory addresses associated with look-up data indicating a permission level associated with that range of memory addresses. For example, the permission data may indicate "read only", "read/write", "no access" or the like. The transaction is allowed to proceed on the basis of any limitations specified by the permission data.

Another aspect is so-called execution privilege as an example of an access mode. Privilege refers to the ability of a running thread, as granted by the access mode controller 105 in response, for example, to a setting in a control register of the CPU 100 (which can only be altered by software running at a privileged or higher access mode) or to the handling of a processor exception, to carry out certain security-related operations. In general terms, operations performed in a higher access mode having a higher access level or higher privilege than lower access mode (having a lower privilege) are such that memory access transactions in the lower access mode are inhibited from accessing at least some processing resources associated with or available to operations or memory access transactions in the higher access mode.

It is possible for lower access mode (for example, unprivileged) software to make a call to transfer control to privileged (or higher access mode) software, but this can be relatively costly in terms of processing resources and latency.

A further aspect is memory address translation. In many systems, the processing circuitry accesses memory addresses or memory mapped resources according to so-called virtual addresses (VAs) in a virtual address space. The memory system and memory mapped resources operate according to physical addresses (PAs) in a physical address space. Address translation is used to provide translation between a VA or VA range and a corresponding PA or PA range. Here, the intervening translation stage allows different threads to operate in different VA spaces while still accessing common underlying resources and can help to avoid malicious code accessing resources which it is not entitled to access, for example by simply not providing a valid translation in the VA space associated with that thread. The translations themselves are set or established by supervisory code running at a higher privilege level, such as an operating system (OS) or a so-called hypervisor, and cannot generally be altered by the thread itself running at a lower privilege level.

Note that in some examples, memory address translation may in fact be performed as a two-stage or multiple stage process, for example comprising a first stage and a second stage. A virtual address (VA) required by an executing program, thread or other system module is translated to an intermediate physical address (IPA) by the first stage translation. The IPA is translated to a physical address (PA) by the second stage translation. One reason why multiple stage translation is used is for security of information handling when multiple operating systems (OS) may be in use on respective "virtual machines" running on the same processor. A particular OS is exposed to the VA to IPA translation, whereas only the hypervisor (software which oversees the running of the virtual machines) has oversight of the second stage (IPA to PA) translation.

Embodiments of the present techniques may provide, as part of the functionality of the memory protection unit, a single stage (VA to PA) translation, or any one or more stages of a multiple stage translation process as outlined above. In the context of a generic description, the address provided to be translated (for example a VA or an IPA) is referred to as the "input" memory address and the address provided as the result or outcome of the translation process is referred to as the "output" memory address (for example, an IPA or a PA).

In the present examples, address translation is an optional feature, and indeed in some examples it may be carried out by the MPU 110 (as a combined memory protection and memory translation operation). The MPU 110 may provide at least some of the functionality of a translation lookaside buffer (TLB) for this purpose. In general terms, the TLB is a cache or buffer of translation information and, when a memory address translation is needed, reference is made first to the TLB. If data defining the required translation is not held by the TLB, then the translation is obtained, for example by consulting page tables held in memory (generally a slower and more costly procedure than simply consulting the TLB). When the required translation has been obtained, the TLB is populated with information defining that translation.

The MPU 110 itself will be described further below, but for the purposes of FIG. 1 it is noted that the MPU 110 is associated with storage such as MPU registers 112 which hold at least the permission data used by the MPU 110 in its memory protection functionality. Writing to the MPU registers 112 requires a higher access mode, for example a higher execution privilege or "privileged mode", distinguished from "non-privileged mode".

The arrangement of FIG. 1 therefore provides an example of circuitry or apparatus comprising: memory access control circuitry 110 responsive to initiation of a memory access transaction relating to a given memory address, the memory access transaction being initiated in an access mode selected from at least a higher access mode and a lower access mode.

Figure 2:
FIG. 2 schematically illustrates aspects of a transaction bus.

An example technique will now be described by which the access mode (for example, privileged, not privileged) is communicated. FIG. 2 schematically illustrates a so-called transaction bus which may be used to link the various components of FIG. 1. An example of such a bus is the so-called Advanced Extensible Interface (AXI) bus, which includes bus connections 200 for carrying address, data and control signals, along with a bus line 210 to carry a signal indicating whether or not the transaction is being handled in privileged mode. This signal on the bus line 210 can therefore be used by a resource to detect whether or not the access-requesting entity is entitled to access that resource. The bus line 210 carrying access mode information is also illustrated schematically as being provided at least between the CPU 100 and the interconnect and between the interconnect 120 and the peripheral device(s) 150, although in a practical implementation it may well be that this bus line is provided at each instance of the use of a transaction bus, and is simply ignored by or not relevant to the operation of the memory 130 and the peripherals 140.

Figure 3:
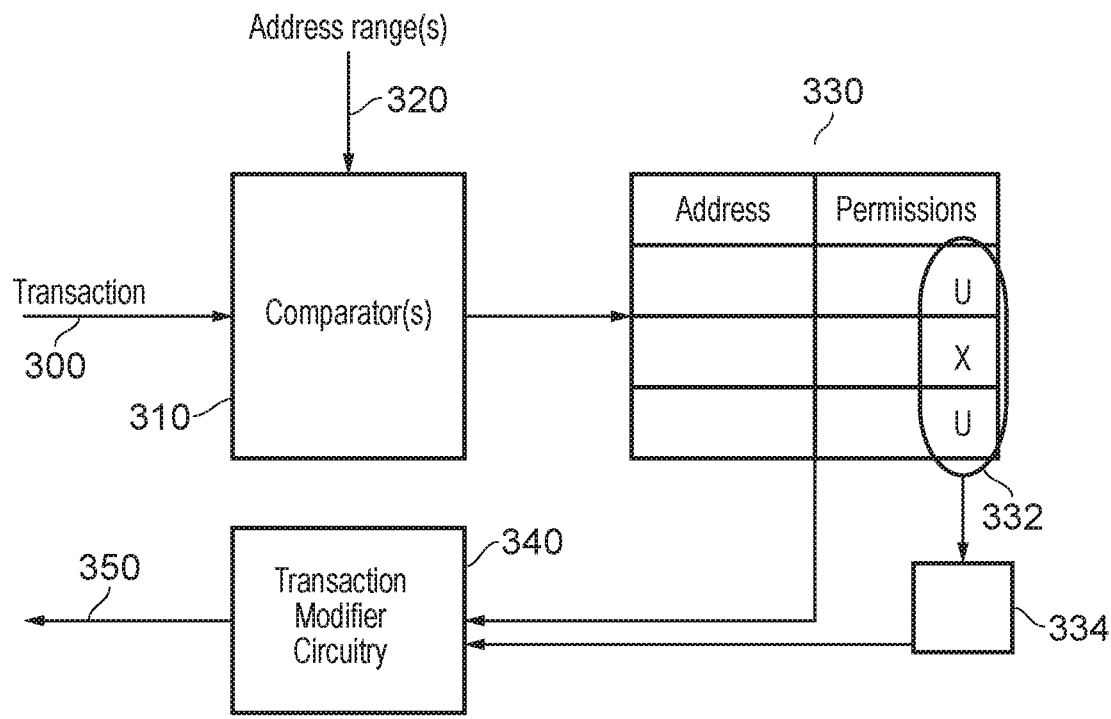
FIGS. 3 and 4 schematically illustrate example circuitries.
Figure 4:
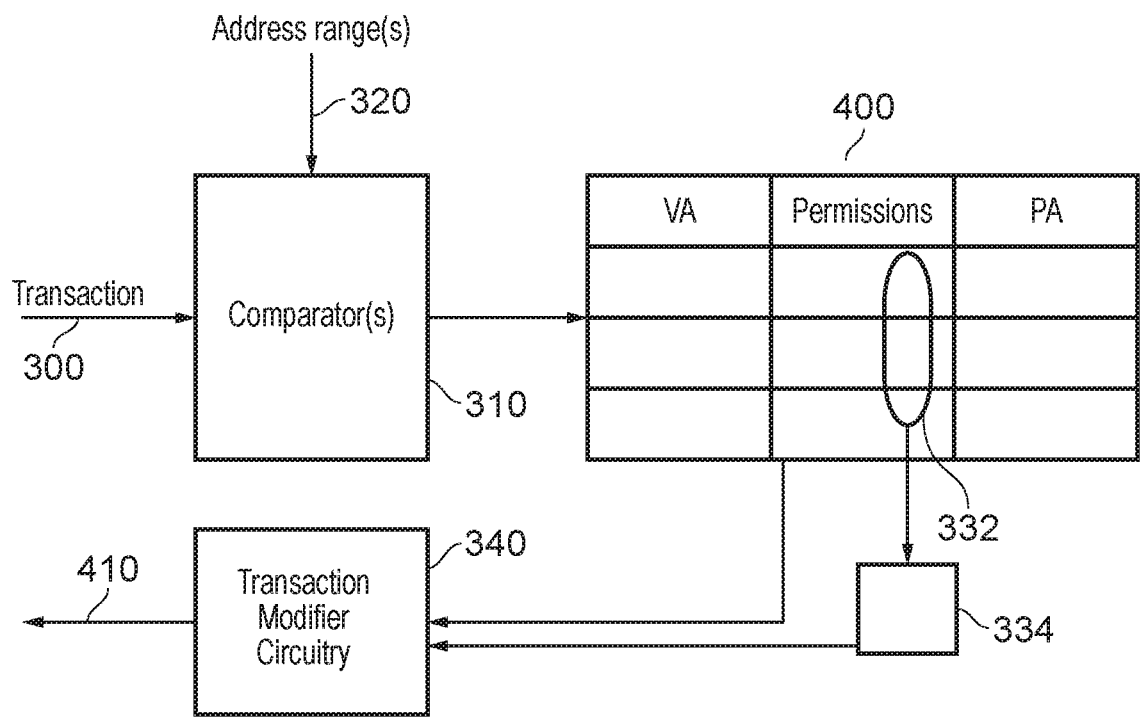

FIGS. 3 and 4 are schematic representations of examples of the MPU 110, without an address translation function (FIG. 3) and with a combined address translation function (FIG. 4).

Referring to FIG. 3, address information from a memory access transaction 300 is compared by one or more comparators 310 with address range data 320 to detect which of a set of address ranges the transaction address lies in. The outcome of the comparison is used to access a table 330 associating address ranges with permission data. As mentioned above, at least parts of the table 330 relating to the permission data may be held in the MPU registers 112. The permission data may include at least a field 332 indicating whether an upgraded access mode (or privilege) should be applied to a transaction in that memory address range. In the example of FIG. 3, an entry of "U" indicates "do upgrade" and an entry of "X" indicates "do not upgrade". The contents of the field 332 are detected by detector circuitry 334 (shown separately but which could be part of the functionality of the MPU registers 112 or transaction modifier circuitry 340 to be described below) and the detector circuitry 334 provides a control signal to the transaction modifier circuitry in dependence upon the contents of the field 332 for the current or given address.

The permission data is associated with the transaction and provided to the transaction modifier circuitry 340. In response to the contents of the field 332, the transaction modifier circuitry can behave as follows:

If the transaction as received was in the lower access mode (for example, non-privileged) and the field 332 is "U" then the transaction modifier circuitry sets the "privileged" signal on the bus line 210 to indicate "privileged";

If the transaction as received was in the lower access mode (for example, non-privileged) and the field 332 is "X" then the transaction modifier circuitry makes no change to the "privileged" signal on the bus line 210;

If the transaction as received was in the higher access mode (for example, non-privileged) then the transaction modifier circuitry makes no change to the "privileged" signal on the bus line 210 irrespective of the contents of the field 332.

The transaction modifier circuitry outputs the (potentially modified) transaction 350, including other aspects of its associated permission data, for processing by the target device mapped to the relevant memory address.

These operations therefore provide an example of the memory access control circuitry 110 comprising:

circuitry 310, 330 to access permission data associated with candidate memory addresses to be accessed;

detector circuitry 334 to detect, for a memory access transaction initiated in the lower access mode, whether the permission data associated with the given memory address indicates an upgraded access mode; and transaction modifier circuitry 340 to associate with the memory access transaction an indication that the memory access transaction may proceed in the higher access mode, when the detector circuitry detects that the permission data associated with the given memory address indicates an upgraded access mode.

The input to and output from the circuitry 110 provide examples of an interface to a transaction bus (FIG. 2) to carry data 200 defining memory access transactions; the transaction bus carrying access mode data 210 indicating an access mode of a memory access transactions carried by the transaction bus.

As described above, the transaction modifier circuitry 340 is configured to set the access mode data to indicate the higher access mode when the detector circuitry detects that the permission data associated with the given memory address indicates an upgraded access mode.

A feature of this arrangement is that the circuitry to access permission data is configured to inhibit modification of the permission data by a memory access transaction in the lower access mode. In other words, the upgraded access mode cannot be used to provide upgraded access to the MPU registers 112, as this would represent an unwanted security risk in the system. This restriction can be hard-wired or encoded into the operation of the MPU 110 or in other examples the permission data is simply configured (for example, in a predetermined way or by the entity such as an OS which sets the permission data) not to indicate an upgraded access mode for access to the permission data itself.

The comparator(s) 310 provide an example in which the circuitry to access permission data is configured to access permission data in respect of one or more ranges of memory addresses; and the detector circuitry is configured to detect whether the given memory address lies within a range of memory addresses selected from the one or more ranges of memory addresses.

The MPU registers 112 provide an example of storage circuitry to store the permission data; wherein the circuitry to access permission data is configured to access the storage circuitry.

An example arrangement by which the MPU 110 also provides a memory address translation function will now be described. Here, the MPU 110 provides the functionality of the TLB discussed above, in that memory address translation data is held at the MPU 110 along with the permission data. Indeed, both types of data can be obtained (where they are not already held by the MPU 110) from the same source such as a set of page tables held in memory and populated by the OS or hypervisor.

The arrangement of FIG. 4 is similar in many respects to that of FIG. 3 and corresponding parts will not be described again. The arrangement of FIG. 4 however provides the function of translation circuitry to translate input memory addresses (as discussed above) to respective output memory addresses.

The table 400 in FIG. 4 provides, in addition to the permission data including the field 332, data defining translations of individual addresses or ranges of addresses from input memory address to output memory address. The received transaction 300 is defined by an input memory address or input memory address range, and the output transaction 410 is defined by a corresponding output memory address or output memory address range. Therefore the memory access control circuitry 110, FIG. 4, is configured to receive a memory access transaction 300 relating to a given input memory address; the translation circuitry 400 is configured to translate the given input memory address to a given output memory address; and the memory access control circuitry 110 is configured to launch the memory access transaction 410 for processing using the given output memory address.

The potential modification of the privilege level is as described above. It is noted that the upgrade field 332 can be associated with the input memory address or the output memory address (or in effect, both as there is a mapping or translation between them), so that the "given memory address" referred to above may be one of the given input memory address and the given output memory address.

In the case that the required translation is not present in the MPU 110 of FIG. 4, in which case it is at least likely that the permission data may be not present as well, the translation circuitry 400 is configured to access stored translation data (such as page table data, held in the memory 130) indicative of translations between input memory addresses and respective output memory addresses. At the same operation, the permission data may also be populated in the table 400. The table 400 provides an example of storage circuitry to store the translation data indicative of translations between input memory addresses and respective output memory addresses; wherein the storage circuitry is configured to store the permission data associated with one of the input memory addresses and the respective output memory addresses.

Figure 5:
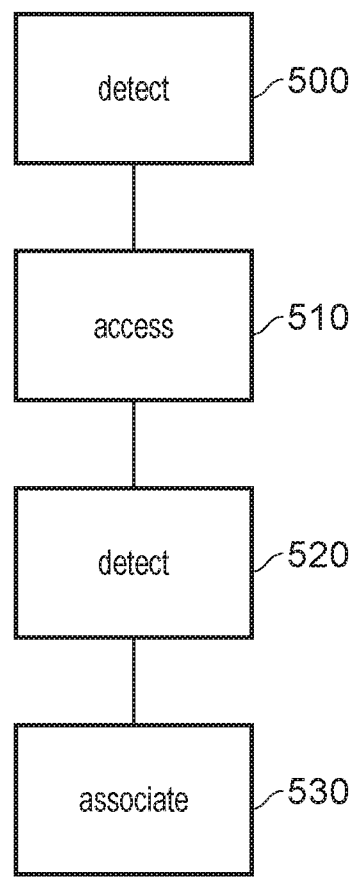
FIG. 5 is a schematic flowchart illustrating a method.

FIG. 5 is a schematic flowchart representing a method comprising:

detecting (at a step 500) initiation of a memory access transaction relating to a given memory address, the memory access transaction being initiated in an access mode selected from at least a higher access mode and a lower access mode, the higher access mode having a higher access level than the lower access mode such that memory access transactions in the lower access mode are inhibited from accessing at least some processing resources associated with memory access transactions in the higher access mode;

accessing (at a step 510) permission data associated with candidate memory addresses to be accessed;

detecting (at a step 520), for a memory access transaction initiated in the lower access mode, whether the permission data associated with the given memory address indicates an upgraded access mode; and associating (at a step 530) with the memory access transaction an indication that the memory access transaction may proceed in the higher access mode, in response to a detection that the permission data associated with the given memory address indicates an upgraded access mode.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Circuitry comprising:
memory access control circuitry responsive to initiation of a memory access transaction relating to a given memory address, the memory access transaction being initiated in an access mode selected from at least a higher access mode and a lower access mode, the higher access mode having a higher access level than the lower access mode such that memory access transactions in the lower access mode are inhibited from accessing at least some processing resources associated with memory access transactions in the higher access mode, the memory access control circuitry comprising:
circuitry to access permission data associated with candidate memory addresses to be accessed;
detector circuitry to detect, for a memory access transaction initiated in the lower access mode, whether the permission data associated with the given memory address indicates an upgraded access mode; and
transaction modifier circuitry to associate with the memory access transaction an indication that the memory access transaction may proceed in the higher access mode, when the detector circuitry detects that the permission data associated with the given memory address indicates an upgraded access mode.

2. The circuitry of claim 1, comprising an interface to a transaction bus to carry data defining memory access transactions; the transaction bus carrying access mode data indicating an access mode of a memory access transactions carried by the transaction bus.

3. The circuitry of claim 2, wherein the transaction modifier circuitry is configured to set the access mode data to indicate the higher access mode when the detector circuitry detects that the permission data associated with the given memory address indicates an upgraded access mode.

4. The circuitry of claim 1, wherein the circuitry to access permission data is configured to inhibit modification of the permission data by a memory access transaction in the lower access mode.

5. The circuitry of claim 4, wherein the permission data is configured not to indicate an upgraded access mode for access to the permission data.

6. The circuitry of claim 1, wherein:
the circuitry to access permission data is configured to access permission data in respect of one or more ranges of memory addresses; and
the detector circuitry is configured to detect whether the given memory address lies within a range of memory addresses selected from the one or more ranges of memory addresses.

7. The circuitry of claim 1, comprising:
storage circuitry to store the permission data;
wherein the circuitry to access permission data is configured to access the storage circuitry.

8. The circuitry of claim 1, comprising translation circuitry to translate input memory addresses to respective output memory addresses.

9. The circuitry of claim 8, wherein:
the memory access control circuitry is configured to receive a memory access transaction relating to a given input memory address;

the translation circuitry is configured to translate the given input memory address to a given output memory address;

the memory access control circuitry is configured to launch the memory access transaction for processing using the given output memory address.

10. The circuitry of claim 9, wherein the given memory address is one of the given input memory address and the given output memory address.

11. The circuitry of claim 8, wherein the translation circuitry is configured to access stored translation data indicative of translations between input memory addresses and respective output memory addresses.

12. The circuitry of claim 11, comprising:

storage circuitry to store the translation data indicative of translations between input memory addresses and respective output memory addresses;

wherein the storage circuitry is configured to store the permission data associated with one of the input memory addresses and the respective output memory addresses.

13. The circuitry of claim 1, in which the higher access mode has a higher execution privilege and the lower access mode has a lower execution privilege.

14. Circuitry comprising:

memory access control means responsive to initiation of a memory access transaction relating to a given memory address, the memory access transaction being initiated in an access mode selected from at least a higher access mode and a lower access mode, the higher access mode having a higher access level than the lower access mode such that memory access transactions in the lower access mode are inhibited from accessing at least some processing resources associated with memory access transactions in the higher access mode, the memory access control means comprising:

means for accessing permission data associated with candidate memory addresses to be accessed;

means for detecting, for a memory access transaction initiated in the lower access mode, whether the permission data associated with the given memory address indicates an upgraded access mode; and means for associating with the memory access transaction an indication that the memory access transaction may proceed in the higher access mode, when the detecting means detects that the permission data associated with the given memory address indicates an upgraded access mode.

15. A method comprising:

detecting initiation of a memory access transaction relating to a given memory address, the memory access transaction being initiated in an access mode selected from at least a higher access mode and a lower access mode, the higher access mode having a higher access level than the lower access mode such that memory access transactions in the lower access mode are inhibited from accessing at least some processing resources associated with memory access transactions in the higher access mode;

accessing permission data associated with candidate memory addresses to be accessed;

detecting, for a memory access transaction initiated in the lower access mode, whether the permission data associated with the given memory address indicates an upgraded access mode; and associating with the memory access transaction an indication that the memory access transaction may proceed in the higher access mode, in response to a detection that the permission data associated with the given memory address indicates an upgraded access mode.

* * * * *